(12) United States Patent
Rutschmann

(10) Patent No.: US 6,263,251 B1
(45) Date of Patent: Jul. 17, 2001

(54) AUTOMATIC SETTING OF GAIN IN CONTROL LOOPS

(75) Inventor: Richard Rutschmann, Wutöschingen (DE)

(73) Assignee: Deutsche Thomson-Brandt GmbH, Villingen-Schwenninghen (DE)

( * ) Notice: Subject to any disclaimer, the term of this patent is extended or adjusted under 35 U.S.C. 154(b) by 0 days.

(21) Appl. No.: 09/207,965

(22) Filed: Dec. 9, 1998

(30) Foreign Application Priority Data

Dec. 23, 1997 (DE) .............................................. 197 57 440

(51) Int. Cl.[7] .................................................. G05B 13/02
(52) U.S. Cl. ........................................... 700/37; 369/44.36
(58) Field of Search .................................. 700/56, 67, 71, 700/62, 59, 37; 702/189; 73/900; 318/608, 561; 369/58, 44.36, 44.35

(56) References Cited

U.S. PATENT DOCUMENTS

| | | | |
|---|---|---|---|
| 4,827,202 | 5/1989 | Kurz et al. | 318/608 |
| 4,878,211 | 10/1989 | Suzuki et al. | 369/44.36 |
| 4,942,564 | 7/1990 | Hofer et al. | 369/58 |
| 4,947,093 | 8/1990 | Dunstan et al. | 318/560 |
| 5,249,116 | 9/1993 | Cloetens | 700/55 |
| 5,369,345 | 11/1994 | Phan et al. | 318/561 |
| 5,416,759 | 5/1995 | Chun | 369/44.36 |
| 5,559,772 | * 9/1996 | Takeda | 369/44.36 |
| 5,600,615 | * 2/1997 | Kiyoura et al. | 369/44.35 |

FOREIGN PATENT DOCUMENTS

| | | |
|---|---|---|
| 3635859 A1 | 5/1988 | (DE) . |
| 3638831 A1 | 5/1988 | (DE) . |
| 264 837 A1 | 4/1988 | (EP) . |
| 453 233 A2 | 10/1991 | (EP) . |

OTHER PUBLICATIONS

EPO Search Report.

* cited by examiner

*Primary Examiner*—Kevin J. Teska
*Assistant Examiner*—Chad Rapp
(74) *Attorney, Agent, or Firm*—J. S. Tripoli; E. P. Herrmann

(57) ABSTRACT

A method and arrangement for automatically setting a gain in a control loop using a tuning signal provides in a one method step, measurement of existing gain while a tuning signal is input, and then calculating consequent gain changes, which is to be carried out in the control loop, from a measured value for the gain. The reciprocal of the measured gain is calculated and the reciprocal of measured gain is used to calculate a gain change to automatically re-establish the gain.

14 Claims, 5 Drawing Sheets

AUTOMATIC SETTING OF GAIN IN CONTROL LOOPS

FIELD OF THE INVENTION

The invention relates to a method and arrangement for automatically setting the gain in control loops, as used in CD or DVD players for example, in order to focus the scanning or recording light or laser beam on the optical recording medium, or to follow the information track.

BACKGROUND OF THE INVENTION

In order to set the gain in a control loop, it is already known practice to superimpose a sinusoidal signal on the reference variable and to compare the controlled variable and the control difference with one another in order to obtain, from this comparison, a criterion for setting the control gain, cf. DE-A 36 35 859. For this purpose, it is preferably the amplitudes of the controlled variable and of the control difference that are compared with one another. In addition, mention is made of measuring a phase margin and using this measurement to derive a criterion for setting the control gain. In comparing the amplitudes, synchronous rectifiers are used to filter out those oscillation components of the control difference and of the controlled variable whose frequency is equal to the input frequency. Using a control unit, the gain of the controller is then changed until a comparator establishes that the filtered-out oscillation components of the controlled variable and of the control difference are of equal magnitude. The known method is therefore an iterative method which takes up a lot of time or is slow on account of the step-by-step tuning. Evaluating the phase information requires a high degree of complexity and is likewise slow, as a result of step-by-step tuning. Reducing the number of comparison steps inevitably leads to greater inaccuracy. When comparing the amplitudes of the controlled variable and of the control difference, care should also be taken to ensure that the control gain is not set exactly, since oscillation components are not in phase with the input frequency of the controlled variable and the control difference. Furthermore, using a frequency which is different from the critical frequency presupposes that the loop gain at this frequency is known.

SUMMARY OF THE INVENTION

The object of the invention is to provide a method and arrangement for automatically setting the gain in control loops, which are characterized by a rapid yet reliable setting and/or tuning procedure.

This object is achieved by the features specified in main claims. Advantageous designs and developments are specified in subclaims.

One aspect of the invention is the acceleration of the tuning procedure when automatically setting the gain. To this end, the final tuning value is set by a single measurement and subsequent calculation. There is no longer any need for a successive approximation to the tuning value, which means that tuning is considerably faster. In only one method step, an existing gain factor is measured whilst a tuning signal is input, a change which is to be carried out to obtain the desired value is calculated and the desired value of the gain is set. The tuning signal or tuning frequency used is preferably a sinusoidal noise frequency which is equal to the frequency at which the absolute-value curve for the gain of the open loop intersects the 0-dB line. The sinusoidal noise frequency is added, for example, to the controlled variable of the control loop. The value of the existing gain which is formed or the existing gain factor which is formed is, for example, the quotient of the amplitudes of controlled variable and control difference. To avoid the disadvantages arising from the phase margin between the controlled variable and the control difference, the amplitudes of controlled variable and control difference are formed from a signal for the controlled variable and the control difference, respectively, which signal has been subjected to band-pass filtering, squaring, low-pass filtering and square-root extraction. Using a band-pass filter, the tuning frequency is filtered out of the control or control difference signal. Squaring the signals is provided in order to produce a signal which is independent of the sign, and a low-pass filter is used to form an average of the squared tuning frequency, from which the amplitude is determined by means of multiplication and root function calculation. The amplitude signals formed in this way, for example, of controlled variable and control difference represent an existing gain factor stated as a quotient of the amplitudes of controlled variable and control difference. The desired gain equal, for example, to 1 or 0 dB is then set using the reciprocal value of the measured gain factor. For this purpose, a gain setting means formed by a multiplier, for example, is provided in the control loop. This is used to set the gain to a desired value in only one method step. As the absolute-value curve for the gain is approximately linear in the range of the tuning frequency, gain factors which differ from the value 1 may also be set with a high degree of accuracy. The reason for this is that the frequency-dependent rise in the gain is determined from the quotient of the amplitudes of the controlled variable and control difference. As this is a measured existing gain, the tuning procedure has a high level of reliability in comparison with solutions which alter the gain using, for example, tables which are determined with the aid of a model.

However, in addition to the above embodiment, which uses the controlled variable and the control difference to measure the gain, it is also possible to implement other embodiments, which use other connection points in the control loop to measure the gain. In this case, it is then also necessary to take into consideration the particular features arising from the selection of connection points for gain measurements. If the input noise signal and the control difference are used for measuring gain, for example, such a measurement will have an offset of 6 dB, but will not differ, in principle, from the solution indicated here. The offset of 6 dB should then be taken into account in assessing the measured gain value. From this aspect, the inventive method for automatically setting a gain in a control loop is relatively independent of the choice of connection points for gain measurement.

In order to ensure that the existing gain factor was determined in the linear range of the gain characteristic curve, an additional check is made to establish whether the quotient of the amplitudes of controlled variable and control difference has a value of less than 1. If this does not apply, a further aspect of the invention provides for the gain to be set at a lower value, before the measurement is even carried out, using a factor of less than 1, preferably 0.75.

BRIEF DESCRIPTION OF THE DRAWINGS

The invention is explained in greater detail below with the aid of drawings and an exemplary embodiment. In the drawings.

DETAILED DESCRIPTION OF THE PREFERRED EMBODIMENTS

Figure 1:
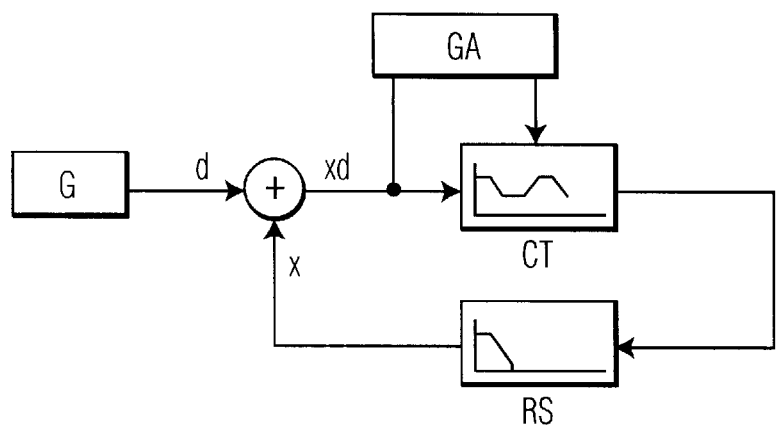
FIG. 1 shows a schematic sketch for automatically setting a gain.

Reference symbols are used condordantly in the figures. FIG. 1 shows the schematic sketch for automatically setting a gain in only one method step. In a control loop comprising a control amplifier CT and a controlled system RS, a tuning signal generator G is used to input a tuning signal d into the control loop, and whilst the tuning signal d is input, or after it has been input, a gain setting means GA is used to set the gain automatically in only one method step. In the exemplary embodiment illustrated in FIG. 1, inputting of the tuning signal d is provided between the output of the controlled system RS and the input of the control amplifier CT. Or in other words: the tuning signal d is input at a summation point which is supplied with the controlled variable x and whose output provides the control difference xd. In principle, however, a tuning signal d may be input at any point in the control loop. However, the point at which the tuning signal d is input must be taken into account when calculating a gain factor which is to be set using the gain setting means GA. When determining the existing gain factor by comparing the tuning signal d with the control difference xd, an offset of 6 dB should be taken into account, for example. Using the gain setting means GA, an existing gain factor for the control loop is measured and a change in the gain which is to be carried out is calculated, and this is then used to set the gain in the control loop automatically. In general, a gain or a gain factor may be specified as the ratio of a reference signal to a measurement signal. It is already known practice to compare the amplitudes or the phases of the tuning signal and of the measurement signal with one another, and to change the gain in the control loop until a specified amplitude or phase ratio is achieved. According to known methods, the gain in the control loop was changed step by step in order to approach the desired ratio in this manner. For automatically setting the gain in a control loop, therefore, a number of method steps were required. Setting the gain in only one method step is made possible by the fact that an existing gain factor is measured and a change which is to be carried out in order to achieve a desired value of the gain is calculated. The calculated value then represents the value used to set the gain. The measurement signal used is a signal from the control loop, the said signal representing the existing gain factor. The signal representing the existing gain factor is preferably the amplitude of a measurement signal whilst the tuning signal d is input. In order to calculate the existing gain factor, the measurement signal, which represents a gain factor whilst the tuning signal d is input into the control loop which is not yet tuned, is put into a ratio with a reference signal. The reference signal is formed by the tuning signal d, which is known on account of the known parameters of the tuning signal d. A quotient formed from the measurement signal and the reference signal then represents the existing gain factor. The quotient representing the existing gain factor is preferably formed using a microprocessor provided in the gain setting means GA. Since the tuning signal d provided is, for example, a tuning frequency formed by a sinusoidal noise frequency whose frequency is just at the frequency at which the absolute-value curve for the gain of the open loop intersects the 0-dB line, the gain change to be carried out in the control loop must take into account the existing gain factor. For example, in order to set a gain of 1, the gain in the control loop is multiplied by the reciprocal value of the quotient representing the existing gain factor. Consequently, automatic setting of the gain in the control loop is achieved using only one method step. Since the change in the gain in the control loop which is to be carried out in order to set a gain of 1 is known, gain values which are different from the value 1 may also be set. This is possible, in particular, by virtue of the fact that the absolute-value curve for the gain in the region of the tuning frequency is approximately linear. The final tuning value is determined by a single measurement and subsequent calculation. No successive approximation is required, which means that tuning is significantly faster.

In the embodiment shown in FIG. 1, it has been assumed that the tuning signal d is essentially constant. Under this requirement, the existing gain factor is determined using only one measurement signal, since the tuning signal d can be assumed to be known, and the tuning signal d is a sinusoidal noise frequency whose frequency is equal to or is approximately the frequency at which the absolute-value curve for the gain of the open loop intersects the 0-dB line.

Figure 2:
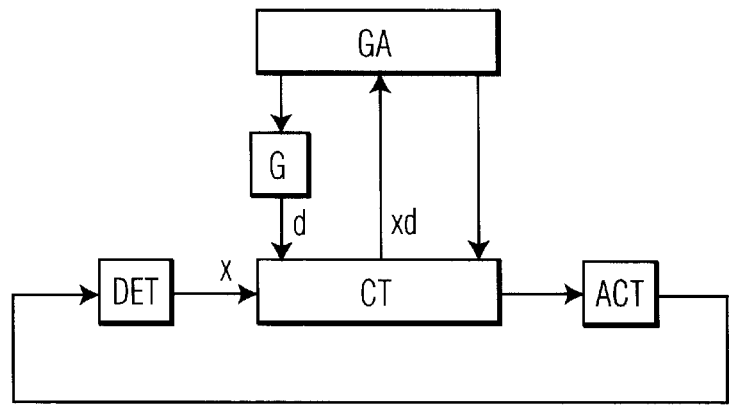
FIG. 2 shows a schematic sketch for automatically setting a gain using tuning signal measurement.

However, it is also possible, as shown in FIG. 2, for the tuning signal d used as reference signal to be included in the measuring procedure. The controlled system RS shown in FIG. 1 is formed by an actuator ACT and a detector DET in FIG. 2. The microprocessor provided in the gain setting means GA determines the instant at which the tuning signal d is input into the control loop. For this purpose, the tuning signal generator G is connected to the gain setting means GA. In a control loop as used, for example, in CD or DVD players in order to focus the scanning light or laser beam on the disc surface and to follow the information track, the actuator ACT and the detector DET are formed by a pick-up. The means for tracking or for focusing the light beam are the actuator with its objective lens, and the photodiods which are used to evaluate the light reflected from the recording medium form the detector DET. Furthermore, the detector DET usually has a preamplifier. Owing to manufacturing tolerances both in the production of the actuator ACT and the detector DET, and on account of the different properties of recording media to be scanned, it should be assumed that the control-loop parameters vary for manufacturing reasons. This means that, although the parameters of the tuning signal d are known, the gain of the tuning signal d can no longer be determined in advance or be regarded as being known.

Figure 3:
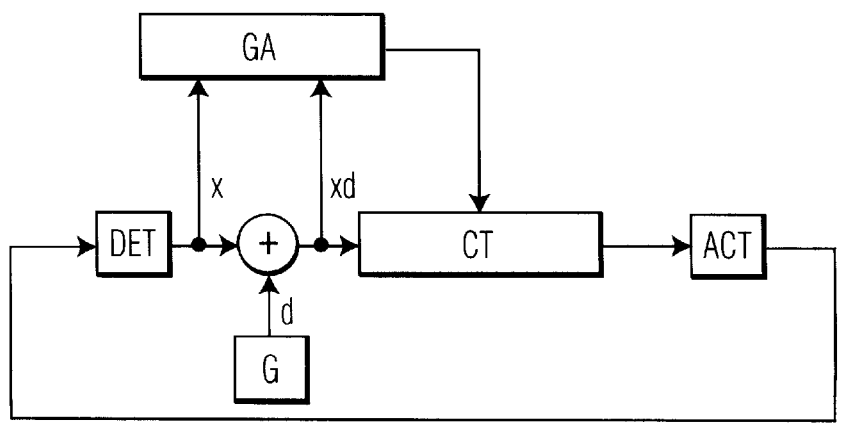
FIG. 3 shows a schematic sketch for automatically setting a gain using control-loop signal measurement.

Including the tuning signal d, used as reference signal, in the measuring procedure nevertheless enables automatic setting of the gain in one method step. The principle of an embodiment of this type is illustrated in FIG. 3. The essential aspect of this embodiment is that the gain setting means GA measures measurement signals upstream and downstream of the point at which the tuning signal d is input. The schematic sketch shown in FIG. 3 is already geared towards a subsequent exemplary embodiment; however, the invention is not limited to the measurement signals being tapped off immediately upstream and downstream of the point at which the tuning signal d is input.

Figure 4:
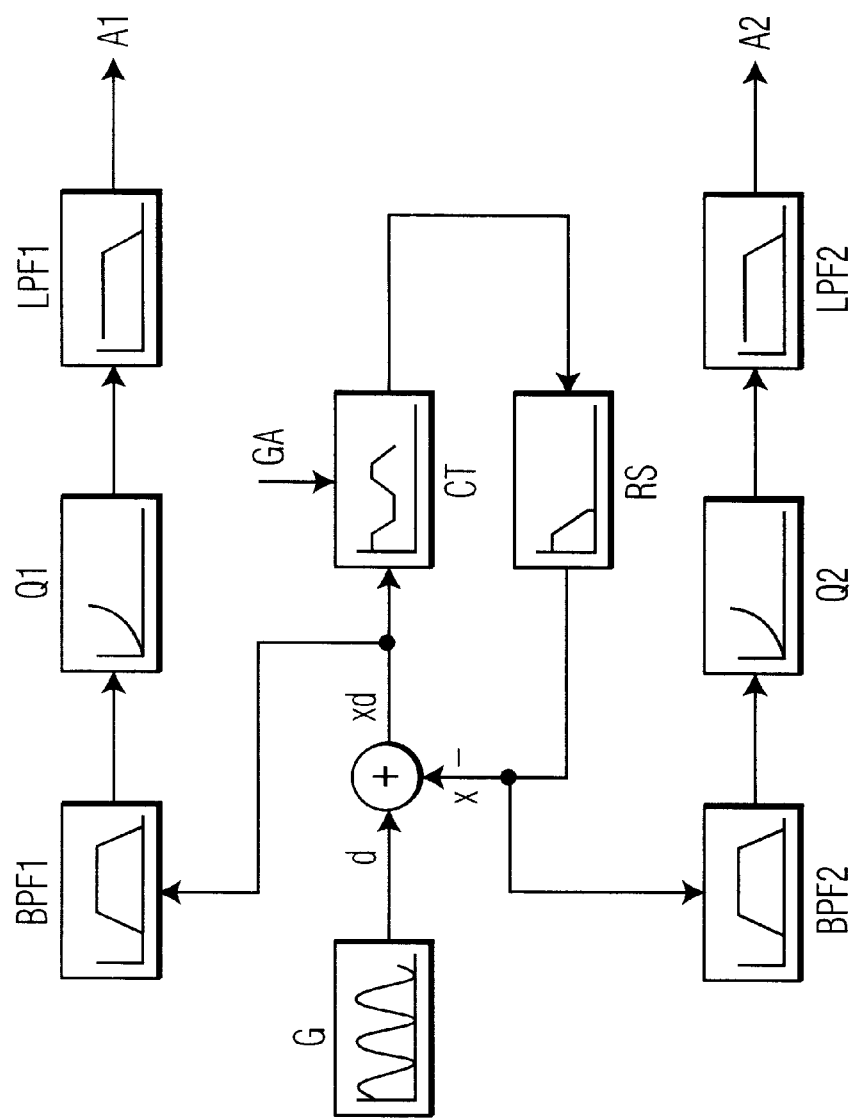
FIG. 4 shows a schematic sketch for measurement signal formation.

A preferred embodiment for measurement signal formation is illustrated in FIG. 4. As shown in FIG. 4, the tuning signal d is input at a point in the control loop which usually corresponds to the reference variable. It is also possible to superimpose a reference variable, which is not shown, on the tuning signal d. In the said control loops, however, the reference variable is generally selected to be 0. As shown in the schematic sketch for measurement signal formation shown in FIG. 4, the signals for a controlled variable x and a control difference xd are each supplied to a band-pass filter BPF1, BPF2. The band-pass filters BPF1, BPF2 are each connected to a squaring element Q1, Q2 downstream of which is connected a low-pass filter LPF1, LPF2. The band-pass filters BPF1, BPF2 are used to filter out the tuning signal d, which is formed by a sinusoidal noise frequency and is equal to the frequency at which the absolute-value curve for the open loop intersects the 0-dB line, from the control signal x and from the control difference xd. The squaring elements Q1 and Q2 produce a signal which is independent of the sign, and the subsequent integrators or low-pass filters LPF1, LPF2 form the average of the squared noise frequency. An output signal A1 from the first low-pass filter LPF1 and an output signal A2 from the second low-pass filter LPF2 are then supplied to a microprocessor which calculates amplitude absolute values of the control signal and of the control difference signal. To this end, the microprocessor multiplies each of the output signals A1, A2 by itself and then calculates the root function. The quotient of the amplitudes of controlled variable x and control difference xd then represents the existing gain value for the control loop. If the quotient or the existing gain for the control loop differs from 1, this means, for the control loop, that the tuning frequency or the sinusoidal noise frequency is amplified or attenuated at the present setting according to the existing gain value. As the tuning frequency selected was a sinusoidal noise frequency equal to the frequency at which the absolute-value curve for the open loop intersects the 0-dB line, it is generally desired that tuning be carried out to a gain value of 1 or to 0 dB. This desired gain is set automatically in that a gain setting means GA is used to multiply the existing gain of the control loop by the reciprocal value of the quotient of the amplitudes of controlled variable x and control difference xd. For this purpose, the control amplifier CT in the control loop preferably has a multiplier which is set to the reciprocal value of the value measured as the existing gain. This means that only a single method step is required for automatically setting the gain in the control loop. Determining the gain value which is to be set or the existing gain value from the quotient of the amplitudes of controlled variable x and control difference xd is made possible by virtue of the fact that the absolute-value curve for the gain in the region of the tuning frequency is approximately linear.

Taking into account the above principle, the method is likewise used in order to set, automatically, gain values which differ from a gain of 1. With an existing gain value which differs from 1, the quotient of the amplitudes of controlled variable x and control difference xd is then multiplied by the desired gain value in addition to multiplication by the reciprocal value of this quotient.

Should the increase in the gain of the control loop be known, the tuning signal d used may also be a sinusoidal noise frequency which has a frequency other than the frequency at which the absolute-value curve for the gain of the open loop intersects the 0-dB line. The band-pass filters BPF1, BPF2 and, if appropriate, also the low-pass filters LPF1, LPF2 should then be designed in accordance with this frequency. Using the existing gain value measured according to the invention, the frequency at which this gain value was determined and the increase in the gain, which is assumed to be known, the frequency at which the gain has the value 1 or intersects the 0-dB line is then determined.

Figure 5:
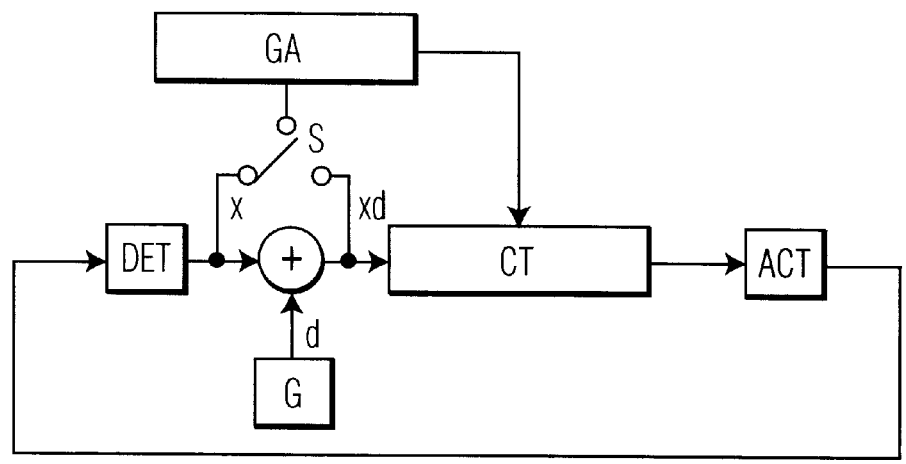
FIG. 5 shows a schematic sketch of an embodiment for measurement signal formation.

As can already be seen in the schematic sketch for measurement signal formation shown in FIG. 4, corresponding modules are used for forming the output signals A1, A2. The embodiment of a circuit arrangement for measurement signal formation is therefore provided as shown in a schematic sketch illustrated in FIG. 5. As shown in FIG. 5, a controlled variable x, provided by a detector DET, and a control difference xd, occurring upstream of the control amplifier CT, are supplied one after the other to the gain setting means GA which advantageously has only a band-pass filter, a squaring element and a low-pass filter. The tuning signal d produced using the tuning signal generator G is then input into the control loop whilst the amplitude of the controlled variable x is measured and whilst the amplitude of the control difference xd is measured. The tuning signal generator G is preferably an oscillator having a selectable frequency and a constant amplitude.

Figure 6:
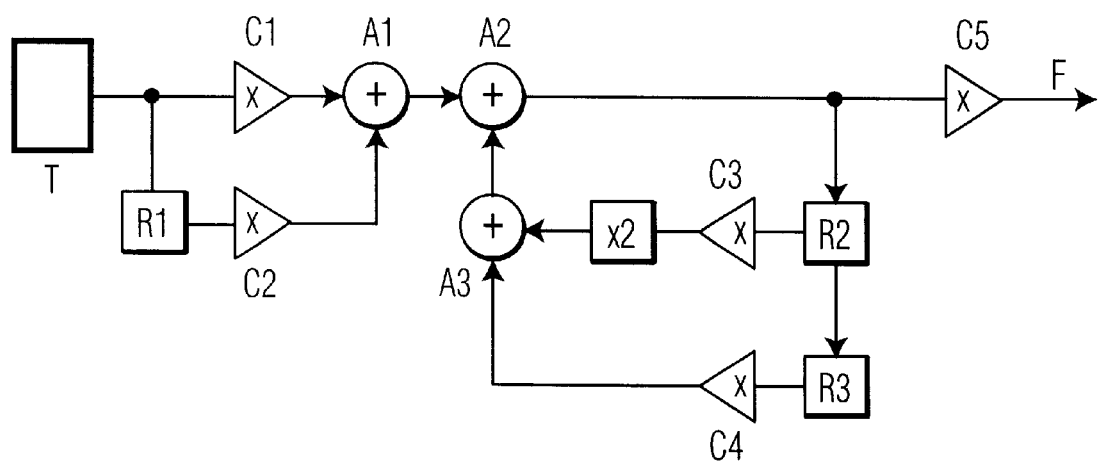
FIG. 6 shows a block diagram of a noise signal generator.

FIG. 6 shows an exemplary embodiment of a tuning signal generator G. This is a digital embodiment comprising a trigger T to which a first register R1 and a first multiplier C1 are connected. The first register R1 is connected upstream of a second multiplier C2 whose output is connected to an adder A1 which also receives the output signal from the first multiplier C1. One input of the single second adder A2 is connected to the output of the first adder A1, and the output of the second adder A2 is connected to the input of a second register R2. The second register R2 has a first output connected to a third multiplier C3, and the second output of the second register is connected to a third register R3. The output of the third register R3 is connected to a multiplier C4 whose output is connected to one input of a third adder A3, whilst the output of the third multiplier C3 is connected to the other input of the adder A3 via a squaring element x2. The output of the adder A3 is connected to one input of the adder A2, and the common connection point of the adder A2 and the second register R2 is connected to a fifth multiplier whose output provides a frequency signal F, whose frequency can be selected by setting the parameters of the multipliers and has a constant amplitude.

Figure 7:
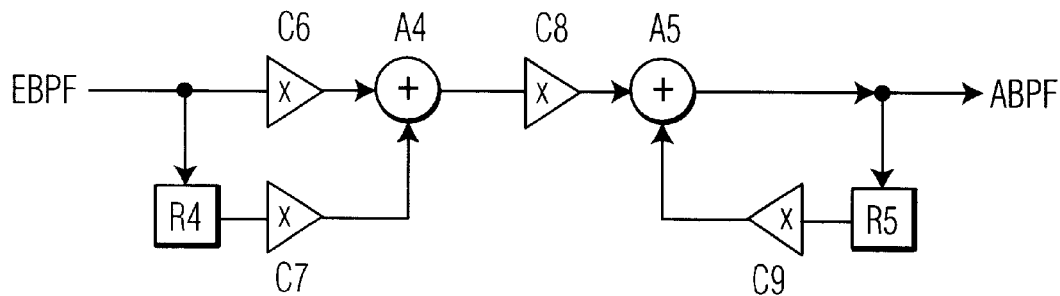
FIG. 7 shows a block diagram of a band-pass filter.

The band-pass filter used is preferably a structure as shown in FIG. 7, in which an input EBPF of the band-pass filter is connected to a fourth register R4 and a sixth multiplier C6. The output of the sixth multiplier C6 is connected to a fourth adder A4, and the other input of the adder A4 is connected to the output of a seventh multiplier, which is connected to the fourth register R4. The output of the fourth adder is connected to one input of a fifth adder AS via an eighth multiplier C8. The output of the fifth adder AS forms both an output ABPF of the band-pass filter as well as a connection point for a feedback path formed by a fifth register R5 and a ninth multiplier C9 which is connected to the input of the fifth adder A5.

Figure 8:
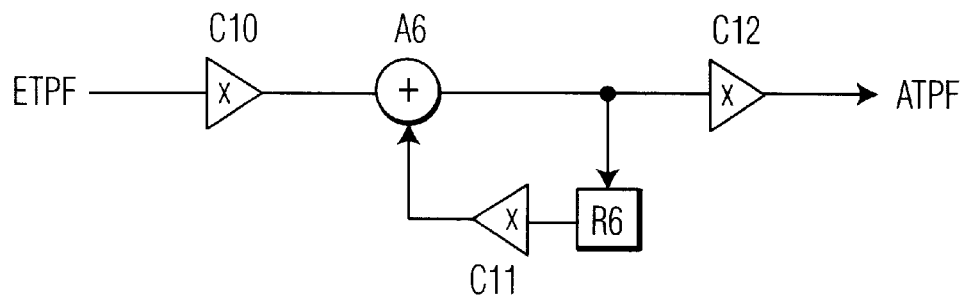
FIG. 8 shows a block diagram of a low-pass filter.

The structure of a digital low-pass filter is shown in FIG. 8. An input ETPF of the low-pass filter is formed by a tenth multiplier C10 whose output is connected to a sixth adder A6. The output of the sixth adder A6 is fed back to the second input of the adder A6 via a sixth register R6 and an eleventh multiplier C11, and the output of the sixth adder forms an output ATPF of the low-pass filter via a twelfth multiplier C12. The characteristics of the band-pass filter and of the low-pass filter are set using appropriate coefficients. These coefficients are the corresponding setting values of the multipliers.

FIGS. 9 to 13 show appropriate amplitude/time graphs for illustrating amplitude signal formation.

Figure 9:
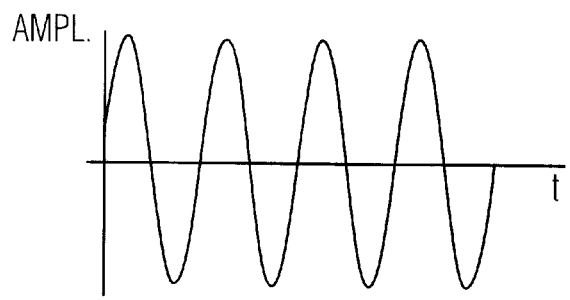
FIG. 9 shows an amplitude/time graph of a noise frequency.

FIG. 9 shows a sinusoidal noise frequency which is used as the tuning signal d and is preferably equal to the frequency at which the absolute-value curve for the gain of the open loop intersects the 0-dB line. Inputting the tuning signal d into a control loop leads to a control difference xd which has, for example, a curve as shown in FIG. 10.

Figure 10:
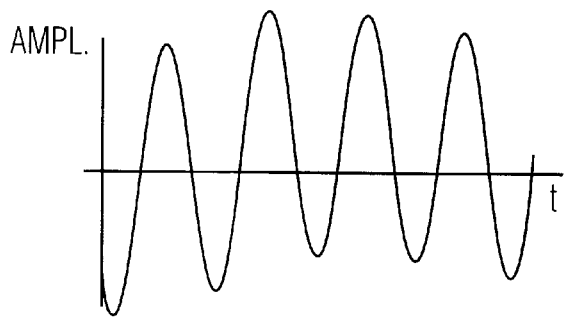
FIG. 10 shows an amplitude/time graph of a noise frequency with a superimposed control difference.

It can be seen in FIG. 10 that the amplitude and phase angle of a tuning signal d, as shown in FIG. 9, are influenced in the control loop. This applies both to the control difference xd and to the controlled variable x. The tuning signal d influenced by the existing gain or the existing characteristics of the control loop is subjected to band-pass filtering in order to filter out the frequency of the tuning signal d from the control signal x or from the control difference xd.

Figure 11:
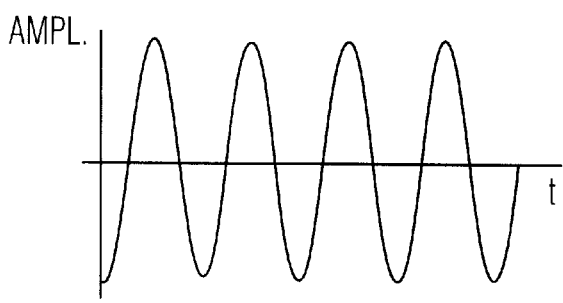
FIG. 11 shows an amplitude/time graph of a noise frequency which has been subjected to band-pass filtering and has a superimposed control difference.
Figure 12:
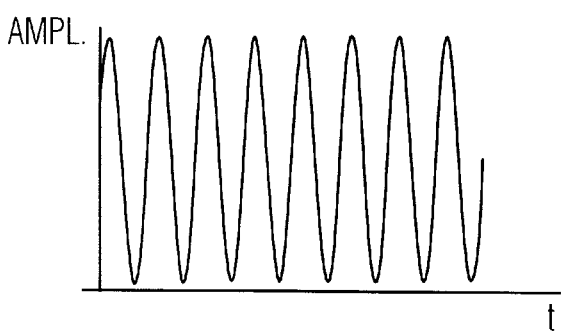
FIG. 12 shows an amplitude/time graph of a noise frequency which has been subjected to band-pass filtering and squaring.

The output of the band-pass filter provides a signal, as shown in FIG. 11, whose amplitude is leveled out and which has the frequency of the tuning signal d. If the existing gain value for the control loop differs from 1, the phase of the signal shown in FIG. 11 is shifted with respect to the tuning signal d. The signal shown in FIG. 11, whose amplitude is already leveled out, is then squared, so that a signal which is independent of the sign is provided at the output of the squaring element, as shown in FIG. 12. On account of having been multiplied by itself, this signal has twice the frequency of the signal shown in FIG. 11.

Figure 13:
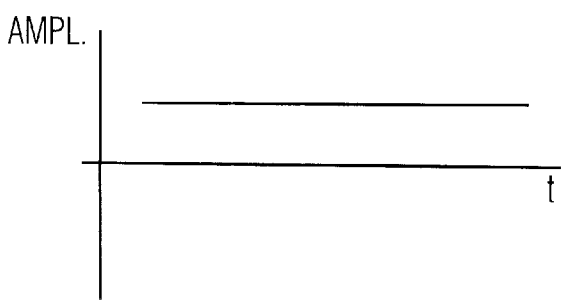
FIG. 13 shows an amplitude/time graph of a noise frequency which has been subjected to band-pass filtering, squaring and low-pass filtering.

The low-pass filter for the signal shown in FIG. 12 then produces an amplitude signal which is shown in FIG. 13 and corresponds to the amplitude of the controlled variable x and the control difference xd. The quotient of the thus formed amplitude signals of control signal and control difference signal then corresponds to the existing gain of the control loop for the input tuning signal d. As already explained above, a desired gain value is then set automatically in the control loop using only one method step.

The invention is not limited to the exemplary embodiment indicated here, in which the control signal and the control difference signal were used for measuring the existing gain of the control loop. When selecting connection points, which are different from the exemplary embodiment, for determining an existing gain of the control loop, appropriate consideration should be given to their effect on the measured gain factor.

What is claimed is:

1. Method for automatically setting a gain in a control loop using a tuning signal, comprising:

in a one method step,
measuring an existing gain while a tuning signal is input;
calculating a gain change, which is to be carried out in the control loop, from a measured value for the gain;
forming the reciprocal of the measured gain; and
using the reciprocal of measured gain to calculate gain change to set the gain automatically.

2. Method according to claim 1, wherein the existing gain is measured whilst a tuning frequency having a constant amplitude is input, the said tuning frequency being used as a tuning signal.

3. Method according to claim 2, wherein the existing gain is measured whilst a tuning frequency having a constant amplitude is input, the said tuning frequency being used as a tuning signal and the tuning frequency used is a sinusoidal noise frequency which is equal to a frequency at which the absolute-value curve for the gain of the open control loop intersects the zero-dB line.

4. Method according to claim 1, wherein the tuning signal is input into the control loop by being added to a controlled variable of the control loop.

5. Method according to claim 1, wherein the existing gain is measured as a quotient of amplitude values of a controlled variable and of a control difference.

6. Method according to claim 1, wherein the existing gain is measured as a quotient of amplitude values of a controlled variable and of a control difference and
a dividend of the quotient is formed from an amplitude value of the controlled variable, and
a divisor of the quotient is formed from an amplitude value of the control difference.

7. Method according to claim 1, wherein the existing gain is measured as a quotient of amplitude values of a controlled variable and of a control difference and
the amplitude values of controlled variable and control difference are formed from a signal for the controlled variable and the control difference, respectively, which signal has been subjected to band-pass filtering, squaring, low-pass filtering and square-root extraction.

8. Method according to claim 1, wherein a gain of one or zero dB for the tuning signal in the control loop is set automatically by multiplying the gain in the control loop by a reciprocal of the measured gain.

9. Method according to claim 1, wherein a gain which is different from a gain of one or zero dB for the tuning signal in the control loop is set automatically by multiplying the gain in the control loop by a reciprocal of the measured gain, and multiplying by the gain which is different from one or zero dB.

10. Method according to claim 1, wherein
a first gain is measured whilst a first tuning signal is input and
a second gain is measured whilst a second tuning signal is input,
a gain change for setting a gain for a frequency which is different from the frequencies of the tuning signals is calculated, and
the calculated gain change is used to set the gain automatically.

11. Arrangement for automatically setting a gain in a control loop using a tuning signal, comprising:
a tuning signal generator for producing a tuning signal to be input into the control loop, said tuning signal generator including a two-terminal recursive digital filter with stable limits which serves for producing a tuning signal having a selectable frequency at a constant amplitude;

a circuit arrangement for measuring an existing gain while tuning signal is input, a processor for calculating a gain change from the measured existing gain, and a gain setting means for setting the gain.

12. Arrangement according to claim 11, wherein the circuit arrangement for measuring an existing gain whilst the tuning signal is input comprises:

a band-pass filter, an absolute-value generator and a low-pass filter.

13. Arrangement according to claim 11, wherein the processor for calculating a gain change from the measured existing gain is a processor for forming the reciprocal of a quotient of amplitude values of a controlled variable and of a control difference.

14. Arrangement according to claim 11, wherein the gain setting means is a multiplier added to the control loop.

* * * * *